United States Patent [19]

Sollich

[11] Patent Number: 4,979,463
[45] Date of Patent: Dec. 25, 1990

[54] COATING MACHINE WITH SHAKING DEVICE

[75] Inventor: Helmut Sollich, Rabenkirchen, Fed. Rep. of Germany

[73] Assignee: Sollich GmbH & Co. KG, Bad Salzuflen, Fed. Rep. of Germany

[21] Appl. No.: 419,773

[22] Filed: Oct. 11, 1989

[30] Foreign Application Priority Data

Nov. 23, 1988 [DE] Fed. Rep. of Germany ....... 3839440

[51] Int. Cl.$^5$ ................... A23G 3/20; A23G 7/00; B05C 11/02
[52] U.S. Cl. ...................... 118/21; 118/22; 118/57; 427/346
[58] Field of Search ............ 118/21, 22, 16, 57; 427/346

[56] References Cited

U.S. PATENT DOCUMENTS

| | | | |
|---|---|---|---|
| 1,499,347 | 7/1924 | Conte | 118/22 |
| 2,340,850 | 2/1944 | Wolfson et al. | 118/57 |
| 2,406,437 | 8/1946 | Petrovic | 118/22 |
| 2,446,386 | 8/1948 | Perkins | 118/22 |
| 3,140,199 | 7/1964 | York | 118/57 |

FOREIGN PATENT DOCUMENTS 337253 10/1930 United Kingdom ................. 118/22

Primary Examiner—Jay H. Woo
Assistant Examiner—Khanh P. Nguyen
Attorney, Agent, or Firm—Max Fogiel

[57] ABSTRACT

An arrangement for coating articles with chocolate in which a grating conveyor belt receives the articles to be coated. A shaking device is provided in a region below an upper run of the belt for the purpose of shaking excess liquid chocolate off the articles. The shaking device has a grating mounted pivotably in supporting side members, and this shaking grating has two longitudinal members and transverse members. The transverse members extend transverse to the direction of travel of the belt, whereas the longitudinal members extend along the direction of travel of the belt. A drive unit is connected to the shaker grating to pivotably vibrate the grating for the purpose of shaking the belt. This belt is supported only by the transverse members which have a height that is a multiple of the width of the transverse members. The transverse members, furthermore, are round rods and a respective support bar that has a substantially rectangular cross-section. The rod is mounted on top of the bar at a narrower side thereof.

12 Claims, 4 Drawing Sheets

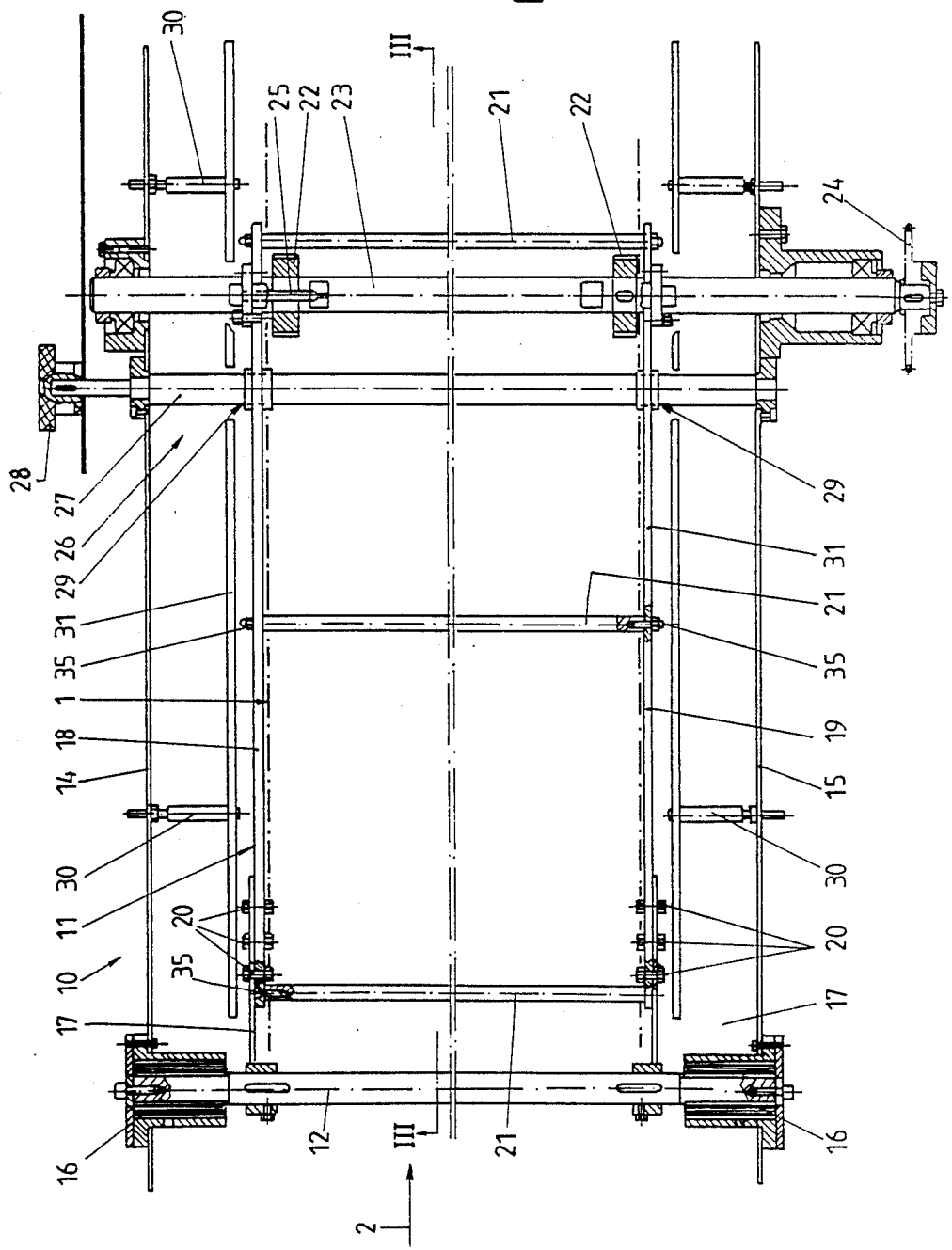

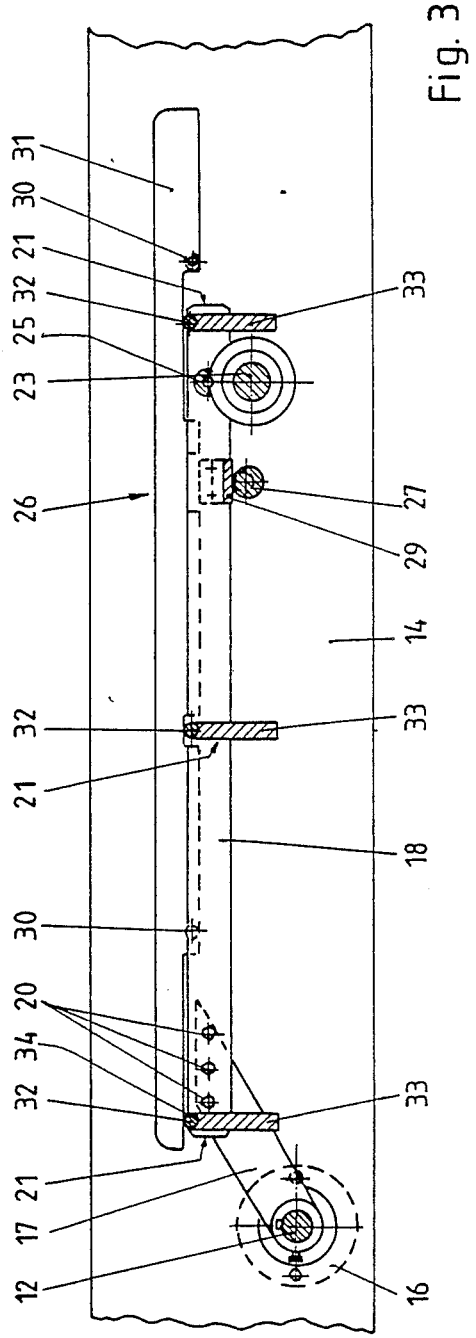

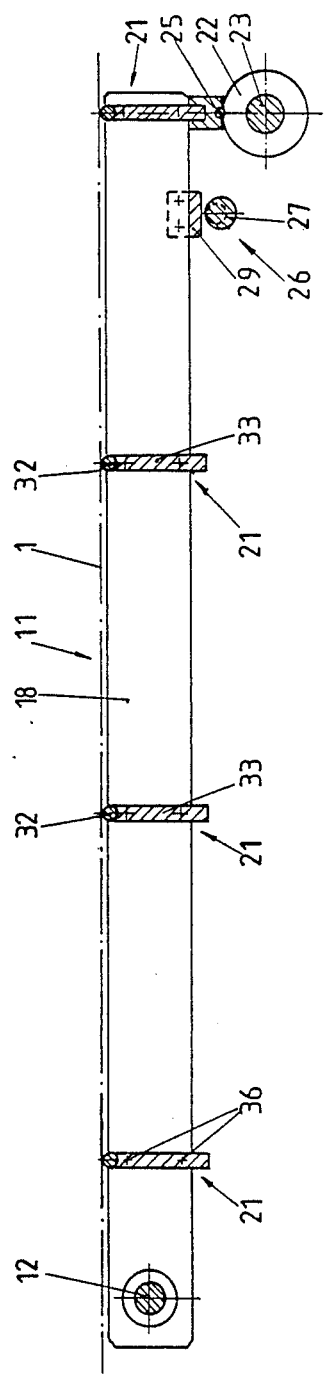

COATING MACHINE WITH SHAKING DEVICE

BACKGROUND OF THE INVENTION

The present invention relates to a coating machine, especially a chocolate-coating machine.

Chocolate-coating machines serve, as is known, to coat articles, such as chocolates, bars, biscuits or cakes, with chocolate either partially or completely. In general, the article runs through a thick curtain of chocolate which covers the surface and the vertical sides. A base wall can also be present to bring the chocolate to the bases of the articles. The articles are thus flooded by the liquid chocolate. A blow-off device and a shaking device provided underneath part of the grating belt ensure removal of excess liquid chocolate from the article, whilst leaving the desired coating of chocolate. As a rule, the blowoff device as well as the shaking device can be regulated in order to adapt them to the performance requirement and the desired wall thickness of the coating, respectively. It depends on the blow-off device on the one hand and the shaking device on the other hand whether all articles, seen over the entire working width of the grating belt of a coating machine and also in running direction, are always coated in the same manner, thus have a chocolate component which is constant in terms of quantity. The maintenance of this condition is extremely important for reasons of quality and costs, because the coating is usually the most expensive part of the end product produced from the article.

In a known chocolate-coating machine of the above-described kind, a shaking device is arranged in a region below the upper run of the grating belt and includes a shaker grating which is mounted in fixedly located side cheeks to be limitedly pivotable about an axle arranged transversely to the running direction of the belt. The grating consists of a plurality of longitudinal rods, thus rods extending in running direction of the belt, which are arranged at spacings and parallel to each other over the working width of the belt. During circulation the belt comes into contact with the surface of these longitudinal rods. The longitudinal rods are mostly mounted on two transverse rods, which serve to keep the longitudinal rods at a spacing and to connect them to the grating. The transverse rods lie underneath the plane formed by the surface of the longitudinal rods, so that the underside of the belt does not come into contact with the transverse rods. When operating with such a grating, an appreciable proportion of the articles, which are coated while lying on the belt in rows one beside the other, will be disposed in the region of the longitudinal rods. Some chocolate in the base region is wiped off any articles moving on the belt above the longitudinal rods. Such articles thereby receive a many cases, unsightly hollow spaces additionally appear at the bases of the articles. A further appreciable disadvantage has resulted in the course of time by the fact that coating machines are increasing in width. Whilst the maximum working widths were once 1000 to 1200 millimetres, the width nowadays is about 2000 millimetres. These large working widths require reinforcement of the grating, which means a disadvantageous increase in weight. Moreover, there may be increased wear of the shaker wheels which set the grating into a vibration with substantial vertical component about the horizontal axle. There can also be resonant oscillation of the grating in the case of large working widths, especially in the middle region with respect to the running direction of the belt, so that the shaken-off quantity of chocolate in the middle region of the belt is different from that in the side regions.

In order to counteract these disadvantages, it has been attempted to stiffen the grating by additional transverse rods, which were loaded onto the s aced longitudinal rods and which had the form of round rods of steel. Since these additional transverse rods were arranged on the longitudinal rods to be protruding upwardly, the underside of the belt came into contact only with the additional transverse rods. This resulted in a uniform appearance of the base of the articles. However, the weight of the grating was thereby increased and the problems of wear and resonant oscillations also increased. A high weight or a large mass of the grating also has a disadvantageous effect on the usable shaking frequency. Frequencies in the order of 300 strokes per minute are used. An increase in the rotational speed of the shaker wheels causes them to jump over individual teeth of the shaker pins arranged at the grating.

SUMMARY OF THE INVENTION

There is therefore a need for a coating machine in which a uniform shaking-off of the excess coating material from articles may take place even in the case of a large working width, so that all articles, independently of their positions, may have coating components which are the same in terms of quantity and also be of uniform appearance.

According to the present invention there is provided coating machine comprising a grating conveyor belt for reception of article to be coated and a shaking device arranged in the region of and below an upper run of the belt and comprising a shaker grating which is pivotably mounted in side members of the machine and which comprises longitudinal members extending in and transverse members extending transversely to a conveying direction of the belt and drive means to effect vibratory pivotation of the grating thereby to shake the belt, the grating having two longitudinal members which define lateral boundaries of the grating and the transverse members being s arranged as to in use be the only part of the grating contacting the belt and each having a height which is a multiple of its width.

In a preferred embodiment the machine comprises a grating belt for the reception of the articles to be coated and a shaking device which is arranged in a region below the upper run of the belt and comprises a shaker grating which is assembled substantially from longitudinal rods extending in running direction of the grating belt and transverse rods extending transversely to the running direction of the grating belt. The grating is mounted in side cheeks to be limitedly pivotable about an axle and is set into vibration by way of driven shaker wheels. Merely two longitudinal rods as righthand and lefthand side rails of the grating and otherwise merely transverse rods, the cross-section of which is several times higher than wide, are provided for the formation of the shaker grating, so that only the transverse rods come into contact with the grating belt. Whilst the gratings of the prior art essentially consisted of longitudinal rods which were supported and kept at a spacing by, as a rule, merely two transverse rods, the grating now consists substantially of transverse rods which are held together by merely two longitudinal rods forming righthand and lefthand side rails. In the case of a very large working width, a third, centrally arranged longitudinal rod can, at most, be provided. The belt comes into contact exclusively with the surface of the transverse rods. This provides the advantage that the contact surfaces between the transverse rods and the belt are constant over the working width, so that the aforedescribed hollow spaces in the base region of the articles no longer arise. The main advantage of the grating, however, is that the excess coating material, for example chocolate, is removed from the coated articles uniformly and independently of the working width. The grating possesses the same properties over the working width, so that it is no longer recognisable from the coated article whether it was coated at the longitudinal centre line of the coating machine, thus in the middle region of the belt, or in the outer regions of the belt. Through the omission of the plurality of the longitudinal rods or the reduction of the longitudinal rods to merely two such rods functioning as side rails, the weight of the grating is also reduced, which is advantageous in respect of usable shaking frequencies and amplitudes. Resonant oscillations of the grating may be able to be avoided even in the case of large working widths. In consequence of the reduction of the weight, there is also a reduced wear of the shaker drive, particularly at the shaker wheels. Through the reduction in the contact area between the grating and the underside of the belt, the risk of accumulation of chocolate in constant operation is also reduced. Since only a few transverse rods are provided, for example three or four, large free spaces are present between the transverse rods, to that chocolate cannot build up at any grating reinforcements in this region. The grating has the same bearing characteristic for the belt over the entire working width and therefore also wipes the bases of the articles uniformly. The number of transverse rods is dependent o the length of the desired shaker region and the working width of the machine as well as the required shaking performance.

It is possible for the transverse rods to be arranged on the two longitudinal rods to protrude upwardly. Consequently, the width of the belt can be somewhat greater than the lense of the transverse rods. Nevertheless, the underside of the belt comes into contact exclusively with the transverse rods. It is, however, also possible to arrange the transverse rods between the longitudinal rods s that the longitudinal rods protrude upwardly. In that case, the belt should have somewhat smaller width than the spacing of the longitudinal rods from each other or than the length of the transverse rods.

The transverse rods advantageously each comprise a respective round rod and a respective support bar, wherein the bar has a substantially rectangular cross-section extending upright and the round rod is mounted on top of the bar. The height of the round rod and bar is such that a sufficient transverse rigidity results with respect to the working width without the transverse rod being able to sag appreciably. At the same time, the production of resonant oscillations in the grating is avoided. The bars are, in effect, shielded by the round rods so that the contact surface for the coating chocolate is reduced. The use of a round rod as a component of the transverse rod is advantageous to the extent that it permits simple and economic manufacture. A first material can be selected for the round rod and different material for the bar, because the round rod is subjected to a wear loading due to the wiping contact with the belt, whilst the bar principally has carrying and stiffening functions.

The bar can have a concave shape on its upper side for areal support of the round rod. Thus, each round rod is supported not only linearly, but also areally by the corresponding bar. This prevents formation of hollow spaces in which chocolate could deposit and which would be difficult t clean.

The round rods may have surface hardening. In general, hardening is required at least at the surfaces of the round rods, because the belt has wiping contact with the rods over a reduced contact area. The round rods and bars ca consist of aluminum in order to achieve a saving in weight. The rods are then improved in their wear properties by surface hardening. It is also possible, however, to use steel, which is hardenable in known manner, as the material for the round rods. The bars in that case can still consist of aluminium. Finally, it is possible to removably mount the round rods in the grating, so that they are exchangeable as parts subject to wear.

The grating can be borne at the side cheeks to be biased against the direction of action of the shaker wheels. This is particularly advantageous in conjunction with the construction of a grating of reduced weight, because it permits use of higher shaking frequencies up to about 800 strokes per minute. The upward movement of the grating may be effected by teeth of the shaker wheels, which run against the shaker pins on the grating and thereby limitedly pivot the grating upwardly about its axle. The return downward movement of the grating takes place in consequence of the effect of gravity on the mass of the grating, with enhancement by a downwardly directed biasing force. This biasing force can be achieved by torsion bearings by tension or compression springs or in other manner. It is important that an increase in weight of the grating is avoided in that case, so that the problem of the resonant oscillations of the grating does not reappear.

Embodiments of the present invention will now be more particularly described by way of example with reference to the accompanying drawings, in which:

BRIEF DESCRIPTION OF THE DRAWINGS

FIG. 2 is a plan view of the shaking device in a first embodiment of the invention;

FIG. 3 is a sectional view of the shaking device along the line III—III in FIG. 2; and FIG. 4 is a view similar to FIG. 3, but of a shaking device in a second embodiment of the invention.

DESCRIPTION OF THE PREFERRED EMBODIMENTS

Figure 1:
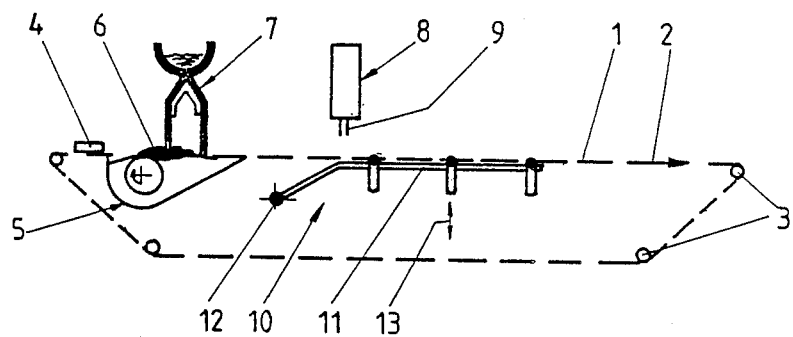
FIG. 1 is a schematic side elevation of a chocolate-coating machine, embodying the invention, showing a shaking device of the machine.

Referring now the drawings, there is shown in FIG. 1 a chocolate-coating machine comprising a grating belt 1 which is driven in circulation according to the arrow 2 and guided over appropriate deflecting rollers 3. Articles 4, of which only a single one is illustrated for the sake of simplicity, are moved through the coating machine from left to right in correspondence with the movement of the belt 1 while lying one beside the other in rows on the belt. A base wall 6 of liquid chocolate is produced in a base station 5 and passes from below upwardly through the belt 1 thereby to bring liquid chocolate mass against the bases of the articles 4. For the coating of the upper and side surfaces of the articles 4, a curtain station 7 is arranged above the plane of the belt 1, from the exit opening of which a thick curtain of liquid chocolate pours downwardly and envelopes the articles 4 together with the base wall 6. In a blow-off station 8, air is blown by way of a nozzle 9 onto the articles 4 and a part of the excess liquid chocolate is thereby removed from the articles. In this region, a shaking device 10 is also provided and comprises a shaker grating 11, which comes into contact from below with the belt 1 and together with the station 8 serves for removal of excess chocolate mass from the articles 4. The grating 11 is mounted to be limitedly pivotable about a axle 12 arranged transversely to the belt running direction and is driven to go up and down according to arrow 13 in a movement with a substantial vertical component wherein the amplitude and the frequency of the vibration which the grating executes can be adjusted, The shakenoff excess chocolate is collected after its passage through the belt and the grating and is carried in circulation with appropriate augmentation of its mass.

FIG. 2 is a plan view of the grating 11 with the essential parts of the shaking device 10 in a first embodiment. The axle 12 is mounted to be limitedly pivotable in locally fixed side cheeks 14 and 15 and its bearing locations are provided with torsion bushings 16, by way of which the axle 12 is loaded with a biasing force in one direction. This force is so directed that the grating 11 is urged downwardly, thus away from the underside of the upper run of the belt 1. Bearing forks 17 are connected, secure against rotation, with the axle 12. The actual grating 11 comprises two longitudinal rods 18 and 19, which function as side rails. The rod 18 is arranged on the lefthand side and the rod 19 on the righthand side. The rods 18 and 19 are connected with the forks 17 by way of fastening screws 20. No further longitudinal rods are provided. A plurality of transverse rods 21 extend over the working width of the belt 1, the boundary of which is represented by chain-dotted lines in FIG. 2. As a rule, three or four such transverse rods 21 are present. The belt 1 comes into contact exclusively with the transverse rods 21 and not with the longitudinal rods 18 and 19. Large free spaces are formed between neighbouring transverse rods 21 and can be utilised for the arrangement of the blow-off station 8, so that chocolate cannot build up in this region.

The vibratory drive of the grating 11 is effected by way of shaker wheels 22, which are constructed as toothed wheels and mounted secure against rotation on a shaft 23, which is also rotatably mounted in the side cheeks 14 and 15. Drive is transmitted by way of a chain wheel 24 either from a special drive device (not shown) which permits regulation of the rotational speed or from a take-off of the coating machine drive. The shaker wheels 22 co-operate with shaker pins 25, of which only one is illustrated for the sake of simplicity. Through the impact of the teeth of the wheels 22 against the pins 25, the grating 11 is in accordance with the shaping of the tooth initially guided upwardly in direction of the arrow 13 (FIG. 1). Subsequently, the grating falls downwardly in correspondence with the following tooth gap, this movement being enhanced by the bias of the torsion bushings 16. In this manner, the vibratory movement is transmitted to the grating 11, wherein the movement is a rotary movement about the axis of the axle 12. The frequency of the vibration can be adjusted through variation of the rotational speed of the shaft 23 and frequencies of between about 300 to 800 strokes per minute can be appropriate. For adjustment of the amplitude, there is provided a setting device 26 which comprises a rotatably mounted and fixable eccentric shaft 27 rotatable by way of a hand wheel 28. The shaft 27 comes into contact with abutment members 29. Whichever part of the surface of the eccentric shaft 27 faces upwardly constitutes an abutment for the members 27, so that the downward movement of the grating 11 is limited. The depth of the tooth gaps between successive teeth of the shaker wheels 22 is thus used only partially if the amplitude is adjusted to be smaller than the depth of the tooth gap. It is evident that a corresponding vibratory movement is transmitted by way of the transverse rods 21 to the belt 1 so that the excess liquid chocolate mass is shaken off not only from the articles 4, but also passes through the belt 1 so that it can be collected in the lower region of the coating machine and recirculated.

Grating limit plates 31 are arranged in fixed positions, but adjustable in their mutual spacing, by way of spacer pins 30 at the side cheeks 14 and 15. The grating 11 and the belt 1 extend between the plates 31.

As FIG. 3 shows, each transverse rod 21 is composed of a round rod 32 and a supporting bar 33. The round rods 32 have circularly round cross-section and are mounted in concave surfaces 34 at the upper ends of the bars 33. The bars 33 have a substantially rectangular crossection with the exception of the concave surfaces 34 and are arranged upright. The bars have an appreciable height, which is matched to the working width of the coating machine and of the grating 11 or the belt 1, and ensure that sagging of the transverse rods 21 over the working width is reduced to a minimum. Moreover, they prevent resonant oscillation of the grating 11 in the cas of large working widths. Due to the divided construction of the transverse rods 21 into round rods 32 and bars 33, it is possible to use different materials. Thus, the rods 32 can consist of, for example, hardened steel shafts or of aluminium axles provided with a surface hardening, whilst the bars 33 can be formed of unhardened aluminium profile in order to, in particular, keep the mass of the grating 11 small. A surface hardening of the round rods 32 is required, since these come into contact with the underside of the belt 1 and the contact area is substantially reduced compared with known shaking devices, so that wear problems could arise without surface hardening. The round rods 32 can be detachably connected by means of screws 35 (FIG. 2) with the longitudinal rods 18 and 19, so that in the case of wear they can initially be fastened in another angular position and thereafter be exchanged. The bars 33 are expediently permanently connected, for example welded, to the longitudinal rods 18 and 19. The bars are arranged protected underneath the round rods 32 s that the problem of deposit of hardenablechocolate mass at the transverse rods 21 is small.

The particular structure of the grating 11 is thus that it consists principally only of transverse rods 21, which extend transversely to the running direction of the belt 1. The transverse rods 21 are so constructed in terms of strength that they alone have the required supporting function and stiffness. The two longitudinal rods 18 and 19 only serve to keep the transverse rods 21 at a mutual spacing and to guide them in respect of the vibratory movement about the axle 12. By contrast, known shaker gratings have always been constructed in respect of their essential elements in such a manner that these extend in longitudinal direction, thus in the running direction 2 of the belt.

A further embodiment of the grating 11 is shown in FIG. 4. In this case the bearing forks 17 are omitted. Instead, the longitudinal rods 18 and 19 are pivotably mounted directly on the axle 12. Four transverse rods 21 are each again composed of a respective round rod 32 and a respective support bar 33. It is recognisable that the round rod 32 can have a larger diameter than the width of the bar 33. It is also possible to fasten the supporting rods 33 detachably, which occurs with the aid of schematically represented connecting screws 36. The shaker pin 25 is arranged underneath a transverse rod 21 and stands in effective connection with a shaker wheel 22 on the shaft 23. It can be seen that the abutment member 29 has moved clear of the eccentric shaft 27, so that the grating 11 is illustrated within an upward or downward movement. The spacings of the transverse rods 21 from each other and the cross-sectional formation of the round rods 32 and of the bars 33 is dependent on the conditions at the coating machine, in particular on the working width, the machine performance and the projected shaking frequency and amplitude.

What is claimed is:

1. An arrangement for coating articles, comprising: a grating conveyor belt for receiving articles to be coated; shaking means in a region below an upper run of said belt for shaking said articles; supporting side members; said shaking means having a shaker grating mounted pivotably in said supporting side members; said shaker grating having two longitudinal members and transverse members, said longitudinal members extending in direction of motion of said belt, said transverse members extending transverse to the direction of motion of said belt; drive means connected to said shaker grating to pivotably vibrate said grating for shaking said belt; said two longitudinal members defining lateral boundaries of said grating, said belt being supported only by said transverse members, said transverse members having a height and width, said height being a multiple of said width; each transverse member comprising a round rod and a respective support bar of substantially rectangular crosssection, said rod being mounted on top of said bar at a narrower side of said bar.

2. An arrangement as defined in claim 1, wherein said transverse members protrude upwardly relative to said longitudinal members.

3. An arrangement as defined in claim 1, wherein said rod has a circumference, said narrower side of said bar being concave for supporting said rod about part of said circumference.

4. An arrangement as defined in claim 1, wherein said rods have hardened surfaces.

5. An arrangement as defined in claim 4, wherein said rods and said bars are aluminum rods and bars.

6. An arrangement as defined in claim 4, wherein said rods are comprised of steel.

7. An arrangement as defined in claim 1, wherein said rods are detachably mounted in said grating.

8. An arrangement as defined in claim 1, including means for urging said grating to move in a direction counter opposite to a direction of motion of said drive means.

9. An arrangement as defined in claim 8, wherein said means for urging said grating comprises a torsion bearing means pivotably mounting said grating.

10. An arrangement as defined in claim 1, wherein said drive means comprises driven wheels.

11. An arrangement for coating articles with chocolate, comprising: a grating conveyor belt for receiving articles to be coated with chocolate; shaking means in a region below an upper run of said belt for shaking off excess liquid chocolate from said articles; supporting side members; said shaking means having a shaker grating mounted pivotably in said supporting side members; said shaker grating having two longitudinal members and transverse members, said transverse members extending transverse to the direction of motion of said belt; drive means connected to said shaker grating to pivotably vibrate said grating for shaking said belt; said two longitudinal members defining lateral boundaries of said grating, said belt being supported only by said transverse members, said transverse members having a height and width, said height being a multiple of said width; each transverse member comprising a round rod and a respective support bar of substantially rectangular crosssection, said rod being mounted on top of said bar at a narrower side of said bar; said shaking means shaking off excess chocolate coating uniformly from said articles even when large working widths of said articles are present, said uniform shaking off of excess chocolate coating from said articles being independent of positions of said articles so that said articles receive a uniform appearance.

12. An arrangement for coating articles with chocolate, comprising: a grating conveyor belt for receiving articles to be coated with chocolate; shaking means in a region below an upper run of said belt for shaking off excess liquid chocolate from said articles; supporting side members; said shaking means having a shaker grating mounted pivotably in said supporting side members; said shaker grating having two longitudinal members and transverse members, said transverse members extending transverse to the direction of motion of said belt; drive means connected to said shaker grating to pivotably vibrate said grating for shaking said belt; said two longitudinal members defining lateral boundaries of said grating, said belt being supported only by said transverse members, said transverse members having a height and width, said height being a multiple of said width; each transverse member comprising a round rod and a respective support bar of substantially rectangular crosssection, said rod being mounted on top of said bar at a narrower side of said bar; said shaking means shaking off excess chocolate coating uniformly from said articles even when large working widths of said articles are present, said uniform shaking off of excess chocolate coating from said articles being independent of positions of said articles so that said articles receive a uniform appearance; said transverse members protruding upwardly relatively to said longitudinal members; said rods having a circumference, said narrower side of said bar being concave to support a rod about part of said circumference; said rods having hardened surfaces; said rods and bars being comprised of aluminum; said rods being detachably mounted in said grating; means for urging said grating in a direction opposite to a direction of motion of said driven means, and comprising a torsion bearing means pivotably mounting said grating, said drive means comprising driven wheels.

* * * * *